United States Patent
Pierson et al.

(10) Patent No.: US 10,281,043 B2
(45) Date of Patent: May 7, 2019

(54) CARBON NANOTUBE BASED THERMAL GASKET FOR SPACE VEHICLES

(71) Applicant: Lockheed Martin Corporation, Bethesda, MD (US)

(72) Inventors: Edward Allen Pierson, Littleton, CO (US); Edward Nathan Harris, Littleton, CO (US); Slade Havelock Gardner, Evergreen, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 301 days.

(21) Appl. No.: 15/206,175

(22) Filed: Jul. 8, 2016

(65) Prior Publication Data
US 2017/0108124 A1 Apr. 20, 2017

Related U.S. Application Data

(60) Provisional application No. 62/191,285, filed on Jul. 10, 2015.

(51) Int. Cl.
*F16J 15/10* (2006.01)
*B64G 1/58* (2006.01)
(Continued)

(52) U.S. Cl.
CPC .............. *F16J 15/102* (2013.01); *B29B 7/86* (2013.01); *B29B 7/90* (2013.01); *B29C 70/465* (2013.01); *B64G 1/58* (2013.01); *F16J 15/064* (2013.01); *F16J 15/10* (2013.01); *B29K 2027/12* (2013.01); *B29K 2105/12* (2013.01); *B29K 2105/167* (2013.01); *B29K 2307/04* (2013.01); *B29K 2507/04* (2013.01); *B29L 2031/265* (2013.01)

(58) Field of Classification Search
CPC ........... B29B 7/86; B29B 7/90; B29C 70/465; B64G 1/58; B29K 2027/12; B29K 2307/04; B29K 2507/04; B29L 2031/265; F16J 15/102; F16J 15/064; F16J 15/10
See application file for complete search history.

(56) References Cited

U.S. PATENT DOCUMENTS 8,168,291 B2  5/2012  Shah et al.
8,220,530 B2  7/2012  Cola et al.
(Continued)

FOREIGN PATENT DOCUMENTS

CN  103739903 A  4/2014
JP  2006-069165 A  3/2006
(Continued)

*Primary Examiner* — Gilbert Y Lee
(74) *Attorney, Agent, or Firm* — McDermott Will & Emery LLP

(57) ABSTRACT

A carbon nanotube-based thermal gasket for space vehicle applications, and process for making the same, is disclosed. A thermal gasket is created that includes one or more free-standing carbon nanotube (CNT) sheets formed of a CNT composition comprising randomly-oriented CNTs and a thermally-conductive resin material. The thermally-conductive resin material is encased within the one or more free-standing CNT sheets and prevented by the one or more CNT sheets from physical contact with an outer side of the thermal gasket.

18 Claims, 4 Drawing Sheets

(51) Int. Cl.
*F16J 15/06* (2006.01)
*B29B 7/86* (2006.01)
*B29B 7/90* (2006.01)
*B29C 70/46* (2006.01)
*B29K 27/12* (2006.01)
*B29K 105/12* (2006.01)
*B29K 105/16* (2006.01)
*B29K 307/04* (2006.01)
*B29K 507/04* (2006.01)
*B29L 31/26* (2006.01)

(56) References Cited

U.S. PATENT DOCUMENTS

| | | |
|---|---|---|
| 8,274,756 B2 | 9/2012 | Wallash et al. |
| 8,778,498 B1 | 7/2014 | Tsotsis |
| 8,808,857 B1 | 8/2014 | Brewer et al. |
| 8,846,143 B2 | 9/2014 | Sansom et al. |
| 8,894,069 B2 * | 11/2014 | Xu .................. E21B 33/1277 |
| | | 277/331 |
| 2003/0213939 A1 | 11/2003 | Narayan et al. |
| 2005/0127329 A1 | 6/2005 | Wang et al. |
| 2007/0095652 A1 | 5/2007 | Knowles et al. |
| 2008/0083562 A1 | 4/2008 | Kuczynski et al. |
| 2011/0073344 A1 | 3/2011 | Zhang et al. |
| 2011/0186775 A1 | 8/2011 | Shah et al. |
| 2011/0275502 A1 | 11/2011 | Eichhorn et al. |
| 2012/0258302 A1 | 10/2012 | Hunt et al. |
| 2012/0301727 A1 | 11/2012 | Kim et al. |
| 2012/0315459 A1 | 12/2012 | Fugetsu et al. |
| 2012/0326391 A1 * | 12/2012 | Hirose .................. F16J 15/022 |
| | | 277/312 |
| 2013/0125375 A1 | 5/2013 | West et al. |
| 2014/0037915 A1 | 2/2014 | Rebouillat et al. |
| 2014/0291589 A1 | 10/2014 | Hata et al. |
| 2014/0318689 A1 | 10/2014 | Tsotsis |
| 2014/0341786 A1 | 11/2014 | Konesky |
| 2015/0064396 A1 | 3/2015 | Sansom et al. |

FOREIGN PATENT DOCUMENTS

| | | |
|---|---|---|
| KR | 2009-0043978 A | 5/2009 |
| WO | WO-2014/124293 A1 | 8/2014 |

* cited by examiner

CARBON NANOTUBE BASED THERMAL GASKET FOR SPACE VEHICLES

This application claims priority benefit under 35 U.S.C. 119(e) from Provisional Patent Application No. 62/191,285, filed Jul. 10, 2015, which is hereby expressly incorporated herein by reference in its entirety herein.

BACKGROUND

The subject technology relates to the development of thermal gaskets for space vehicle applications. Thermal interface materials are used on space vehicles to remove heat from electronic boxes and other components which reach high temperatures. Conventional technology may use two-part silicone-based RTV materials, such as CV-2960 to facilitate the thermal connection between the two components. This type of material may provide thermal performance to remove the heat from electronics and other components on a space vehicle, but is difficult to remove once it has been applied. Due to excessive adhesion characteristics, an RTV-based configuration may result in time-consuming and expensive processes when removing and replacing thermal components, increasing assembly, test and launch operations (ATLO) costs.

Rework issues related to RTV materials have driven the design and engineering of jacking spools to help pry off large boxes. Due to the use of jacking spools (involving considerable hand manipulation), vehicle decks are often damaged, and engineering approvals are required to peel a box off a deck. Other issues include the RTV material running down the side of boxes (e.g., when a payload deck is upside down during vacuum chamber testing), requiring extensive cleaning, a difficult and time-consuming process for technicians. A thermal gasket comprised primarily of RTV may also have a short work-life or gel time which adds to processing constraints, have up to or more than a 7-day cure duration, and/or be susceptible foreign object debris (FOD), all which may limit ATLO in the areas bonded by the RTV gasket.

SUMMARY

The subject technology is directed to a process of creating a carbon nanotube-based thermal gasket for space vehicle applications. In one or more implementations, a CNT-based thermal gasket is created using CNT sheets in one or more of the following ways.

According to various implementations of the subject technology, a thermal gasket comprises one or more free-standing carbon nanotube (CNT) sheets formed of a CNT composition comprising randomly-oriented CNTs and a thermally-conductive resin material. The thermally-conductive resin material is encased within the one or more free-standing CNT sheets and prevented by the one or more CNT sheets from physical contact with an outer side of the thermal gasket. The thermally-conductive resin material may be a room temperature vulcanized (RTV) material, or may be a fluoropolymer-based resin.

The thermally-conductive resin material of a fluoropolymer-based resin may comprise multiple different component additives in a binding fluoropolymer, a first component additive comprising respective elements of a different aspect ratio than elements of a second component additive. In this regard, the thermally-conductive resin material may comprise chopped carbon fibers in a binding fluoropolymer. The thermally-conductive resin material may further comprise nano-copper in the binding fluoropolymer. The thermally-conductive resin material may further comprise CNTs in the binding fluoropolymer. The thermally-conductive resin material may further comprise nano-copper in the binding fluoropolymer.

According to various aspects, the thermal gasket may comprise two free-standing CNT sheets, and wherein the thermally-conductive resin material is physically arranged as a middle layer between the two free-standing CNT sheets. The thermally-conductive resin material may be physically arranged as a middle layer, wrapped by the one or more free-standing CNT sheets.

According to various implementations, a thermal material comprises a top sheet having a first inner and first outer side, a bottom sheet having a second inner and a second outer side, and a thermally-conductive resin positioned between the first inner side of the top sheet and the second inner side of the bottom sheet. At least one of the top sheet and bottom sheet comprises carbon nanotubes, and the thermally-conductive resin is prevented from physical contact with at least one of the first outer side and the second outer side.

According to various implementations of the subject technology, a process for forming a thermal gasket comprises fabricating one or more carbon nanotube (CNT) sheets formed of a CNT composition comprising randomly-oriented CNTs, mixing a thermally-conductive resin mixture, curing the thermally-conductive resin mixture to form a thermally-conductive resin material, encasing the thermally-conductive resin material in the one or more free-standing CNT sheets, and hot pressing the one or more CNT sheets and encased thermally-conductive resin material in a mold. The hot pressing may comprise hot pressing at a first pressure for a first period of time, followed by a second pressure for a second period of time, the second pressure being greater than the first pressure and the second period of time being greater than the first period of time.

According to various aspects, mixing the thermally-conductive resin mixture may comprise mixing resin additives comprising fluoropolymer and carbon fiber, the resin additives being mixed at multiple rotational speeds for multiple periods of time in a centrifugal force mixer, adding one or more second additives to the resin additives and repeating the mixing of the resin additives, and adding a catalyst. The resin additives may comprise multiple components other than fluoropolymer, each of the components having a different aspect ratio. The carbon fiber may comprise a chopped carbon fiber and a milled carbon fiber. Additionally or in the alternative, the one or more second additives may comprise CNTs.

According to various aspects, the mixing of the resin additives may further comprise mixing the resin additives under a vacuum. In this regard, the mixing of the resin additives under the vacuum may comprise varying a speed of the mixer while decreasing a vacuum pressure of a chamber of the mixer.

According to various aspects, two CNT sheets may be fabricated, and encasing the thermally-conductive resin material may comprise placing the thermally-conduct resin material between the two CNT sheets. According to various aspects, one CNT sheet may be fabricated, and encasing the thermally-conductive resin material may comprise placing the thermally-conduct resin material on a portion of the CNT sheet, and folding another portion of the sheet over the thermally-conductive resin material.

It is understood that other configurations of the present disclosure will become readily apparent to those skilled in the art from the following detailed description, wherein various configurations of the present disclosure are shown and described by way of illustration. As will be realized, the present disclosure is capable of other and different configurations and its several details are capable of modification in various other respects, all without departing from the scope of the present disclosure. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is directed to developing a carbon nanotube (CNT)-based readily removable thermal gasket that meets or exceeds the thermal performance of RTV materials. Replacing conventional RTV gaskets with a removable gasket such as described herein may result in large cost reductions and increased competitiveness in the area of spacecraft design. For example, replacing RTV with a CNT-based removable gasket may achieve the same thermal performance but eliminate the wet application, workmanship issues, cure time, curing issues, FOD risk, and potential deck damage often encountered when using RTV. Accordingly, implementation of a CNT-based removable gasket may improve the affordability of a spacecraft by way of cost reductions due to costly RTV removal and rework during ATLO.

Figure 1:
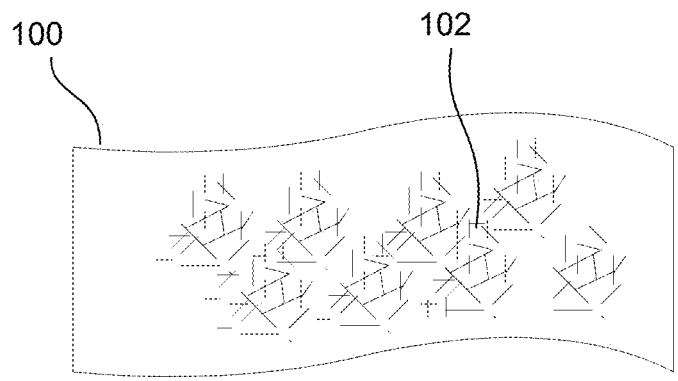
FIG. 1 depicts an example of a free-standing carbon nanotube facesheet.

FIG. 1 depicts an example of a free-standing carbon nanotube facesheet 100 according to aspects of the subject technology. Facesheet 100 is constructed using a composition 102 of nanostructures, such as carbon nanotubes (CNTs). According to various aspects, facesheet 100 may be constructed using conventional methods. However, unlike applications in which nanostructures are grown on a growth substrate or other anchoring structure, the nanostructures of the subject technology may be free-standing and not attached to a surface or substrate. Moreover, the nanostructures may not have a particular orientation (e.g., with respect to a substrate) but, rather, may be randomly-oriented.

According to various aspects, the composition of facesheet 100 may not contain urethane acrylate or a photoinitiator. Due to the thermal conductive qualities of CNTs, the nanostructure composition of facesheet 100 provides for increased thermal conduction of heat laterally through a plane of the facesheet 100. According to various aspects, facesheet 100 may not be grown, e.g., on a substrate.

Figure 2:
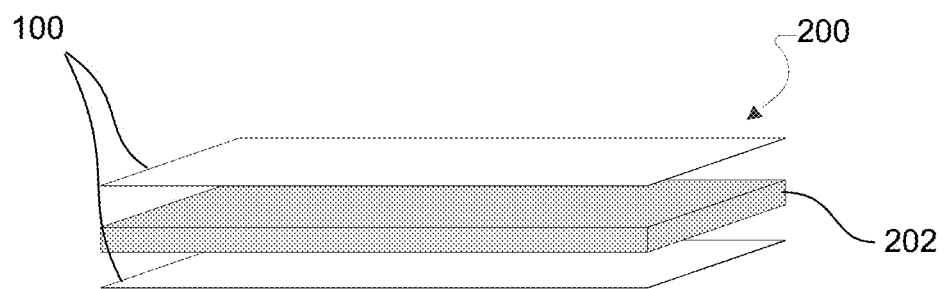
FIG. 2 depicts a first example construction of a thermal gasket material.

FIG. 2 depicts a first example construction of a thermal gasket material 200 according to aspects of the subject technology. Thermal gasket material 200 is created for thermal applications, e.g., in a space vehicle. In the depicted example, two facesheets 100 are fabricated and used as top and a bottom layers over and above a thermally-conductive resin material 202 placed in a middle layer. In this manner, thermally-conductive resin material 202 is encased within the two facesheets which prevent material 202 from physical contact with an outer side of the thermal gasket, and prevent material 202 from interacting with components of the space vehicle interfacing with the completed thermal gasket.

In various aspects, material 202 may be a room temperature vulcanized material. For example, material 202 may be room temperature vulcanization (RTV) silicone. In various aspects, the material 202 may be a fluoropolymer-based resin. As depicted in FIG. 2, material 202 is a "filler" material, physically arranged as a middle layer between the two free-standing facesheets 100. Material 202 may be placed on a facesheet, or between the facesheets, before it is cured and allowed to cure while being supported by the facesheet(s). In various implementations, the facesheet(s) may be uncured and material 202 may be co-cured together with the curing of the facesheet(s).

Figure 4:
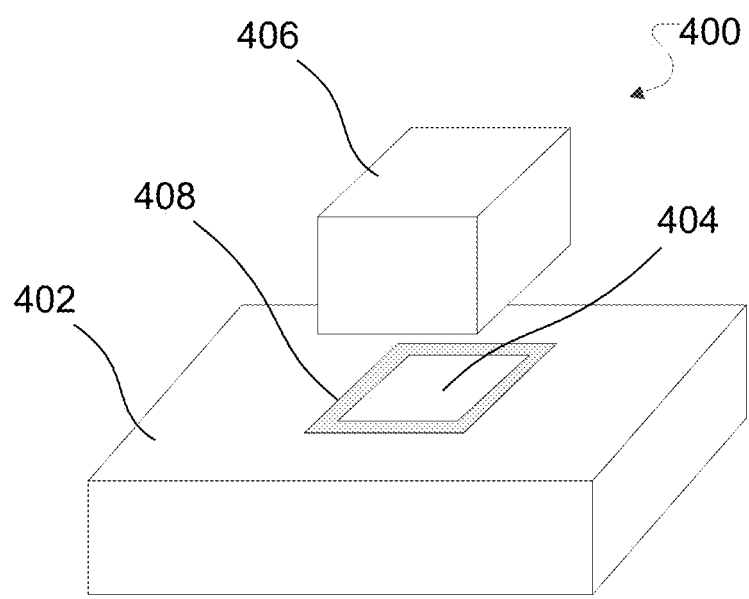
FIG. 4 depicts a diagram of employing an example thermal gasket in an example space vehicle application.

FIG. 2 depicts a portion of thermal gasket material 200, which is used to form a completed thermal gasket 400 (e.g., FIG. 4). Thermal gasket 400 may be constructed according to any pattern required for thermal connectivity between two thermally-conductive parts. For example, thermal gasket 400 may be square, rectangular, circular, ovoid, or multiple compartmental, each respective portion corresponding to a same or different sized shape of thermal interface. With brief reference to FIG. 4, thermal gasket 400 is depicted as a single square. While depicted as having a single middle layer of material 202, it is understood that thermal gasket may be multilayered, having multiple filler layers. For example, another filler layer 202 may be placed on top of the first or second facesheet 100, and enclosed by another facesheet 100. Additionally, the sides of thermal gasket 400 may be open or closed (e.g., sealed by pinching or pressing the outer edges of the facesheets together in a mold) to further prevent material 202 from being exposed to the outer environment, environmental factors, or parts to which the gasket is applied.

Figure 3:
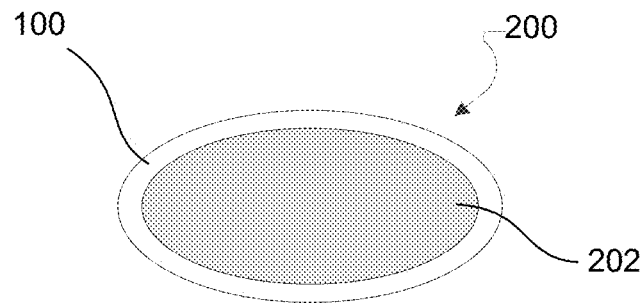
FIG. 3 depicts a second example construction of a thermal gasket material.

FIG. 3 depicts a second example construction of thermal gasket material 200 according to aspects of the subject technology. In the depicted example, resin material 202 is physically arranged as a middle layer, wrapped by one or more facesheets 100. For example, multiple facesheets 100 may be wrapped around material 202 to encase material 202. In another example, one facesheet is fabricated and material 202 is encased by the facesheet by placing material 202 on a portion of the sheet and folding another portion of the sheet over the material.

The depicted example of FIG. 3 is a cross sectional slice of thermal gasket material 200. Thermal gasket material 200 may be constructed according to any of the same patterns described above. However, material 202 is encased on all sides, or otherwise sealed, by wrapping facesheet 100 around material 202. While the cross section of FIG. 3 is depicted as ovoid, any shape may result from the forming of thermal gasket material 200. Additionally or in the alternative, the shape may be defined by the shape of channels within a mold, during the molding of the completed thermal gasket 408 (e.g., FIG. 5). Additionally or in the alternative, a completed thermal gasket material 200 may be constructed by joining sections of material 202 together using a conventional manufacturing process.

FIG. 4 depicts a diagram of employing an example thermal gasket in an example space vehicle application 400, according to aspects of the subject technology. In the depicted example, a space vehicle payload deck 402 includes an interface 404 for connecting to an electronics box 406. Thermal gasket 408 may be used, for example, between vehicle deck 402 and box 406 to minimize or eliminate the risks to the vehicle deck attributed to conventional RTV materials. As described herein, thermal gasket 408 may be created for space vehicle applications using thermal gasket material 200. Accordingly, one or more CNT facesheets may be fabricated and used as top and a bottom layers over and above a thermally-conductive resin material placed in the middle layer. According to various aspects, the facesheets may be used as a wrap around the middle layer. The thermally-conductive resin may be a fluoropolymer-based resin material, as described herein. The fluoropolymer-based resin material may include CNT materials as additives along with surface-treated carbon fibers mixed together in a binding fluoropolymer. In various implementations, the thermally-conductive resin may include an RTV-based resin material.

In accordance with the subject technology, using thermal gasket 408 may provide various benefits. Carbon nanotubes have been shown to have high electrical and thermal conductivity material properties. With regard to conventional silicone-based RTV interfaces located under electronics boxes, and/or used in bonding of payload box to heat pipe panels, conventional RTV materials may be removed and/or replaced with a thermal gasket 408 of the subject technology. Thermal gasket 408 may achieve greater thermal conductivity performance (>1 W/m*K) than conventional technologies while meeting other design requirements such as low outgassing. Moreover, thermal gasket 408 readily allows re-work and will reduce cost during assembly, test, and launch operations (ATLO) processing.

Figure 5:
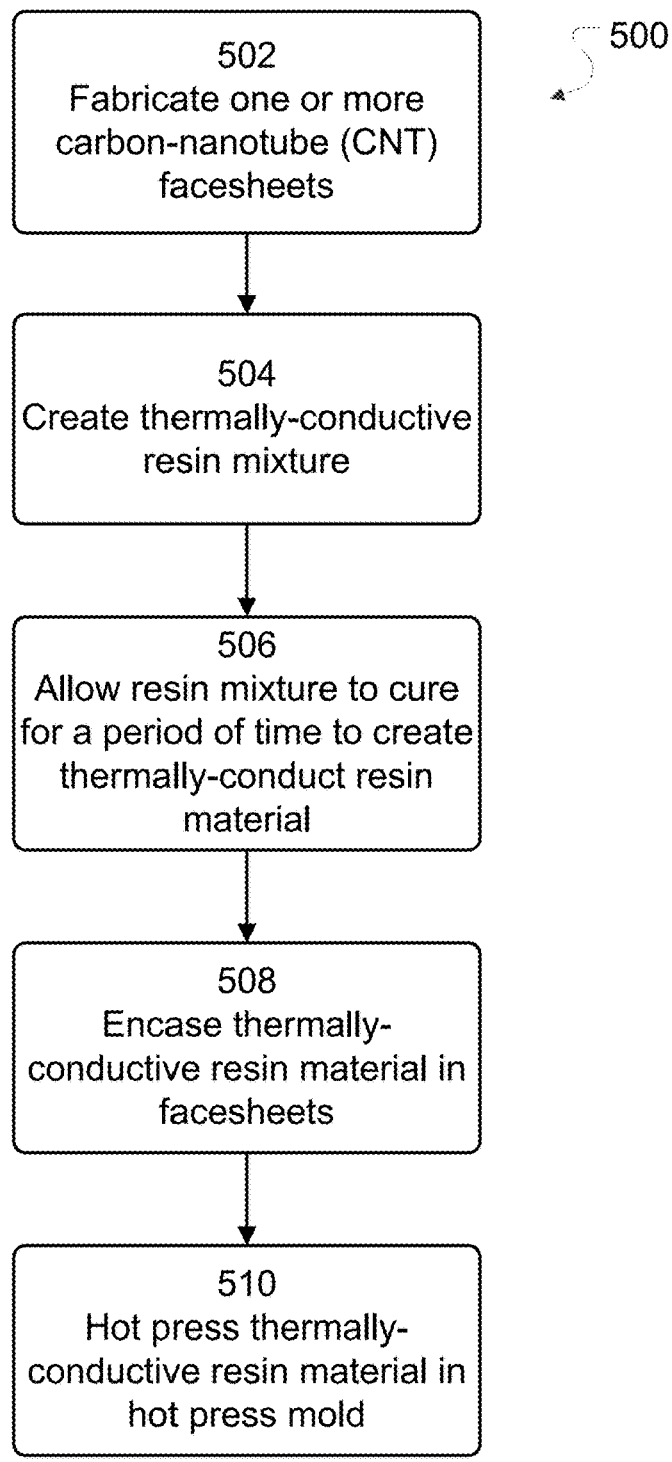
FIG. 5 depicts an example process for the creation of thermal gasket.

FIG. 5 depicts an example process 500 for the creation of thermal gasket 500, according to aspects of the subject technology. For explanatory purposes, example process 500 is described herein with reference to the components of FIGS. 1-4. Further for explanatory purposes, the blocks of example process 500 are described herein as occurring in serial, or linearly. However, multiple blocks of example process 500 may occur in parallel. In addition, the blocks of example process 500 need not be performed in the order shown and/or one or more of the blocks of example process 500 need not be performed. Other blocks may also be performed in connection with the blocks of process 500 to carry out the creation of thermal gasket material 200, thermal gasket 500, and/or its components.

In the depicted example flow diagram, one or more facesheets 100 are fabricated (502). As described previously, each facesheet 100 may be constructed using a composition 102 of nanostructures, such as carbon nanotubes (CNTs), according to, e.g., conventional methods. However, facesheet 100 may include randomly-oriented CNTs and may be uncured, and later cured together with a corresponding resin mixture.

A resin mixture is then created (504). The resin mixture may include one or more of fluoropolymer, nano-copper (Cu), CNTs, and carbon fibers. The carbon fibers may be chopped, milled, or contain both chopped and milled. Other components may also be added. In one example, CNT materials may also be used as additives in the mixture along with surface-treated carbon fibers (e.g., chopped and/or milled) mixed together in a binding fluoropolymer. The resin mixture may be mixed at substantially room temperature (e.g., 72.0 degrees F.) and then allowed to cure. Additionally or in the alternative, an RTV-based resin mixture may be used.

The mixture is allowed to cure for a period of time, resulting in thermally-conductive resin material 202 (506). The resin material 202 may be, e.g., coated on facesheet 100. In some implementations, the mixture is then allowed to cure on the facesheet, resulting in resin material 202 being bonded to facesheet 100 as part of the curing process. According to various aspects, the mixture may be cured at the same time as the curing of the facesheet.

A thermal gasket material 200 is created by encasing thermally-conductive resin material 202 within the one or more facesheets 200 (508). For example, a facesheet 100 may be placed on each side of resin material 202, as depicted in FIG. 2. The placement of the facesheets may be part of the curing process, or after the mixture is cured, as described above. Resin material 202 (or the corresponding uncured mixture) may be placed on a single facesheet 100, and the facesheet may be folded over on top of the mixture (e.g., FIG. 3) to encase resin material 202.

Thermal gasket material 200 is placed in a hot press mold, and hot pressed to form a thermal gasket 400 (510). The thermal gasket material 200 may be placed in a mold and formed according to the size and shape of the desired gasket. In one example, facesheet 100 is formed in an 8.5" diameter mold, which may first be coated with a water-based release agent. The mixture recipe may then be hot pressed (e.g., at 140 degrees) for a first period of time at a first pressure. For example, the mixture recipe may be hot pressed for 1 minute at (a lower) 1 ton pressure. This allows the materials (e.g., resin material 202 (cured or uncured)) to move into place. The mixture recipe may then be hot pressed for a second period of time at a second pressure. The second pressure may be the same or different than the first pressure. For example, the mixture recipe may be hot pressed for 4.5 hours at (a higher) 11 ton pressure.

Figure 6:
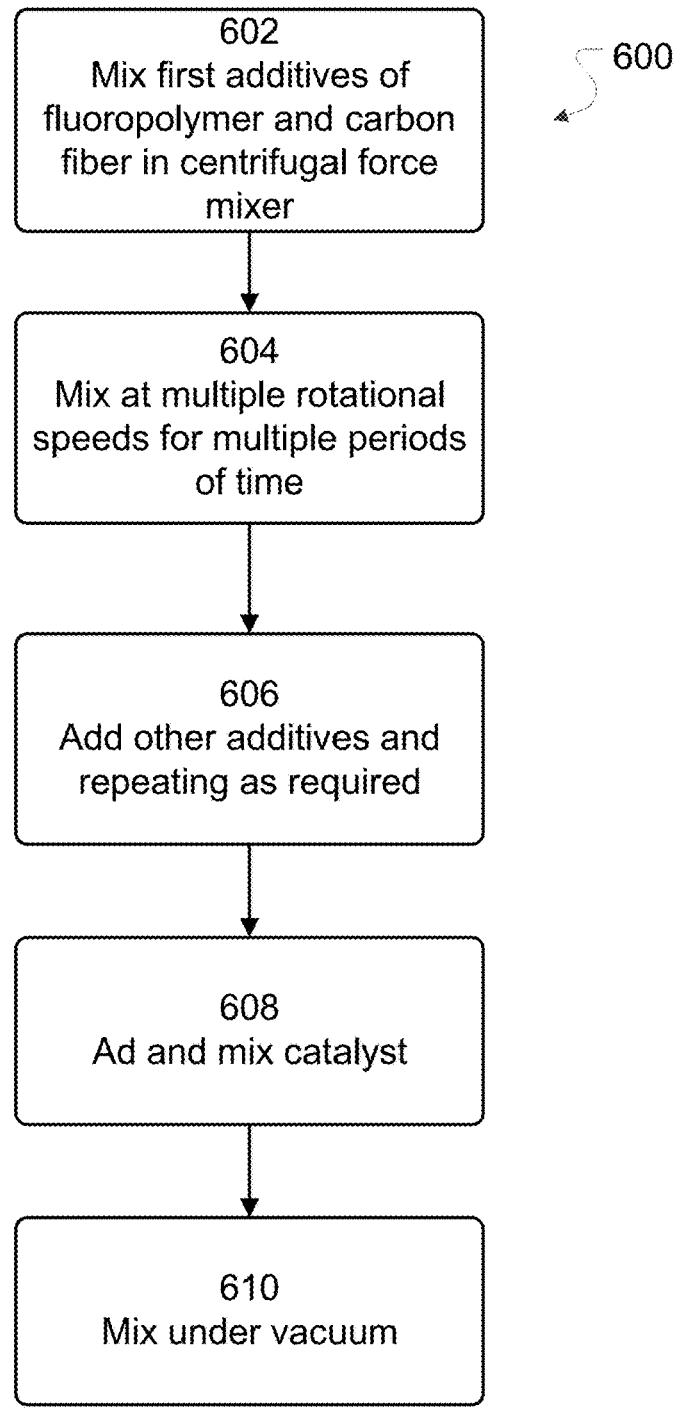
FIG. 6 depicts an example process for the creation of thermally-conductive resin material.

FIG. 6 depicts an example process 600 for the creation of thermally-conductive resin material 202, according to aspects of the subject technology. For explanatory purposes, example process 600 is described herein with reference to the components of FIGS. 1-5. Further for explanatory purposes, the blocks of example process 600 are described herein as occurring in serial, or linearly. However, multiple blocks of example process 600 may occur in parallel. In addition, the blocks of example process 600 need not be performed in the order shown and/or one or more of the blocks of example process 600 need not be performed. Other blocks may also be performed in connection with the blocks of process 600 to carry out the creation of thermally-conductive resin material 202 and/or its components.

The thermally-conductive resin material 202 is created by mixing a variety of component additives in a fluoropolymer base. Each component additive includes a certain amount (e.g., mass and/or density) of elements. According to various aspects, different aspect ratio geometries are used to obtain an optimum density of the material, and to provide for optimum thermal conductivity of the material. In this regard, a mixture used to create thermally-conductive resin material 202 may include a fluoropolymer, nano-Cu, CNTs, and milled and/or chopped carbon fibers. Table 1 describes various example parameters for the elements of each additive, including density (grams/cubic centimeter (g/cc)), diameter (nanometers (nm)), length (nm), and aspect ratio (e.g., diameter to length).

TABLE 1

Component Parameters for Resin Mixture

|  | Fluoro-polymer | Nano-Cu | CNT | Milled CF | Chopped CF |
|---|---|---|---|---|---|
| density (g/cc) | 1.2 | 8.9 | 1.4 | 2.2 | 2.2 |
| diameter (nm) |  | 10 | 20 | 1100 | 1100 |
| length (nm) |  | 10 | 2000000 | 50000 | 6000000 |
| aspect ratio |  | 1 | 10000 | 4.545 | 545.455 |

The component parameters of the resin mixture may be mixed in a mixing container of a centrifugal force mixer at various speeds for various periods of time. One or more first components are added to the mixture. In the depicted example, first additives of fluoropolymer (e.g., 52.024 g) and of chopped carbon fiber (e.g., 8.078 g) are added together (602). The first additives are then mixed at multiple rotational speeds for multiple periods of time (604). For example, the additives may be mixed in the centrifugal force mixer at a first speed of 800 rotations per minute (rpm), followed by mixing at a second speed of 1200 rpm, followed by a third speed of 1800 rpm. The mixer may be stopped and restarted multiple times during the mixing process at each speed. For example, while mixing at the first and second speeds, the mixer may be mixed for 30 seconds and then stopped, restarted for another 30 seconds, and stopped and mixed for another 30 seconds. While mixing at the third speed, the mixer may be mixed for 30 seconds and then stopped, and then restarted for another 30 seconds.

Additional component additives are added to the mixture and the foregoing process repeated for each additive(s) used (606). For example, one or more second additives are added to the mixture, and then mixed at different speeds, while starting and stopping the mixer. According to Table 2, a second amount of chopped carbon fiber (e.g., 5.190 g) is added into the mixture and mixed. One or more third additives are added to the mixture, and then mixed at different speeds, while starting and stopping the mixer. According to Table 2, a first amount (e.g., 16.060 g) of milled carbon fiber is added into the mixture and mixed. One or more fourth additives are added to the mixture, and then mixed at different speeds, while starting and stopping the mixer. According to Table 2, a second amount (e.g., 14.272 g) of milled carbon fiber is added into the mixture and mixed.

One or more fifth additives are added to the mixture, and then mixed at different speeds, while starting and stopping the mixer. According to Table 2, a second amount of fluoropolymer is (e.g., 3.690 g) added into the mixture and mixed. A catalyst may then be added to the mixture, and then the mixture mixed at different speeds, while starting and stopping the mixer (608). According to Table 2, 2.103 g of catalyst may be added. The mixture may also be mixed under vacuum, at various speeds and vacuum pressures (610). According to Table 3, the mixture is mixed under vacuum, starting at 800 rpm for 15 seconds at 423 millibar (mBar), stopped and repeated multiple times at decreasing vacuum pressure, and ending at 1200 rpm for 15 seconds at 15 mBar.

TABLE 2

Centrifugal Force Mixing Procedure

| First additive | 52.024 g fluoropolymer |
|  | 8.078 g chopped carbon fiber |
| rpm/iteration times | 800/:30 s/:30 s/:30 s |
|  | 1200/:30/:30/:30 |
|  | 1800/:30/:30 |
| Second additive | 5.190 g chopped carbon fiber |
| rpm/iteration times | 800/:30/:30/:30 |
|  | 1200/:30/:30/:30 |
|  | 1800/:30/:30/:30 |
| Third additive | 16.060 g milled carbon fiber |
| rpm/iteration times | 800/:30/:30/:30 |
|  | 1200/:30/:30/:30 |
|  | 1500/:30/:30/:30 |
|  | 1800/:30/:30/:30 |
| Fourth additive | 14.272 g milled carbon fiber |
| rpm/iteration times | 800/:30/:30/:30 |
|  | 1200/:30 |
| Fifth additive | 3.690 g fluoropolymer |
| rpm/iteration times | 1200/:30/:30/:30 |
|  | 1500/:30/:30/:30 |
|  | 1800/:30/:30/:30 |
|  | 2100/:30/:30 |
| Catalyst | 2.103 g |
| rpm/iteration times | 1500/:30/:30 |
|  | 1800/:30 |

TABLE 3

Vacuum Mixing Procedure

| RPM | Iteration time | Pressure (mBar) |
|---|---|---|
| 80 | 15 s | 423 |
| 800 | 15 s | 226 |
| 800 | 15 s | 128 |
| 800 | 15 s | 78 |
| 800 | 15 s | 53 |
| 800 | 15 s | 38 |
| 800 | 15 s | 29 |
| 800 | 15 s | 24 |
| 800 | 15 s | 21 |
| 800 | 15 s | 19 |
| 800 | 15 s | 17 |
| 1200 | 15 s | 16 |
| 1200 | 15 s | 15 |

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments will be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more.

Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A thermal gasket, comprising:
   one or more free-standing carbon nanotube (CNT) sheets formed of a CNT composition comprising randomly-oriented CNTs and having inner and outer sides; and
   a thermally-conductive resin material comprising two or more of chopped carbon fibers, milled carbon fibers, CNTs, and nano-copper in a binding fluoropolymer,
   wherein the thermally-conductive resin material is encased within the inner sides of the one or more free-standing CNT sheets and prevented by the one or more free-standing CNT sheets from physical contact with at least one outer side of the one or more free-standing CNT sheets.

2. The thermal gasket of claim 1, wherein the thermally-conductive resin material is a fluoropolymer-based resin.

3. The thermal gasket of claim 2, wherein the thermally-conductive resin material comprises multiple different component additives in a binding fluoropolymer, a first component additive comprising respective elements of a different aspect ratio than elements of a second component additive.

4. The thermal gasket of claim 1, wherein the thermally-conductive resin material comprises the nano-copper in the binding fluoropolymer.

5. The thermal gasket of claim 1, wherein the thermally-conductive resin material further comprises the CNTs in the binding fluoropolymer.

6. The thermal gasket of claim 1, wherein the thermal gasket comprises two free-standing CNT sheets, and wherein the thermally-conductive resin material is physically arranged as a middle layer between the two free-standing CNT sheets.

7. The thermal gasket of claim 1, wherein the thermally-conductive resin material is physically arranged as a middle layer, wrapped by the one or more free-standing CNT sheets.

8. A thermal material, comprising:
   a top sheet having a first inner and first outer side;
   a bottom sheet having a second inner and a second outer side; and
   a thermally-conductive resin positioned between the first inner side of the top sheet and the second inner side of the bottom sheet, the thermally-conductive resin comprising two or more of chopped carbon fibers, milled carbon fibers, CNTs, and nano-copper in a binding fluoropolymer,
   wherein at least one of the top sheet and bottom sheet comprises carbon nanotubes, and wherein the thermally-conductive resin is prevented from physical contact with the first outer side and the second outer side.

9. A process for forming a thermal gasket, comprising:
   fabricating one or more carbon nanotube (CNT) sheets formed of a CNT composition comprising randomly-oriented CNTs;
   mixing a thermally-conductive resin mixture;
   curing the thermally-conductive resin mixture to form a thermally-conductive resin material;
   encasing the thermally-conductive resin material in the one or more free-standing CNT sheets; and
   hot pressing the one or more CNT sheets and encased thermally-conductive resin material in a mold.

10. The process of claim 9, wherein the hot pressing comprises:
    hot pressing at a first pressure for a first period of time, followed by a second pressure for a second period of time, the second pressure being greater than the first pressure and the second period of time being greater than the first period of time.

11. The process of claim 9, wherein mixing the thermally-conductive resin mixture comprises:
    mixing resin additives comprising fluoropolymer and carbon fiber, the resin additives being mixed at multiple rotational speeds for multiple periods of time in a centrifugal force mixer;
    adding one or more second additives to the resin additives and repeating the mixing of the resin additives; and
    adding a catalyst.

12. The process of claim 11, wherein the resin additives include multiple components other than fluoropolymer, each of the components having a different aspect ratio.

13. The process of claim 11, wherein the carbon fiber comprises a chopped carbon fiber and a milled carbon fiber.

14. The process of claim 11, wherein the one or more second additives comprise CNTs.

15. The process of claim 11, wherein the mixing of the resin additives further comprises:
    mixing the resin additives under a vacuum.

16. The process of claim 15, wherein the mixing of the resin additives under the vacuum comprises:
    varying a speed of the mixer while decreasing a vacuum pressure of a chamber of the mixer.

17. The process of claim 9, wherein two CNT sheets are fabricated, and wherein encasing the thermally-conductive resin material comprises:
    placing the thermally-conduct resin material between the two CNT sheets.

18. The process of claim 9, wherein one CNT sheet is fabricated, and wherein encasing the thermally-conductive resin material comprises:
    placing the thermally-conduct resin material on a portion of the one CNT sheet; and
    folding another portion of the one CNT sheet over the thermally-conduct resin material.

* * * * *